No. 862,414. PATENTED AUG. 6, 1907.
C. J. ROBERTS.
BRAKE FOR AUTOMOBILES.
APPLICATION FILED JULY 5, 1906.
2 SHEETS—SHEET 1.
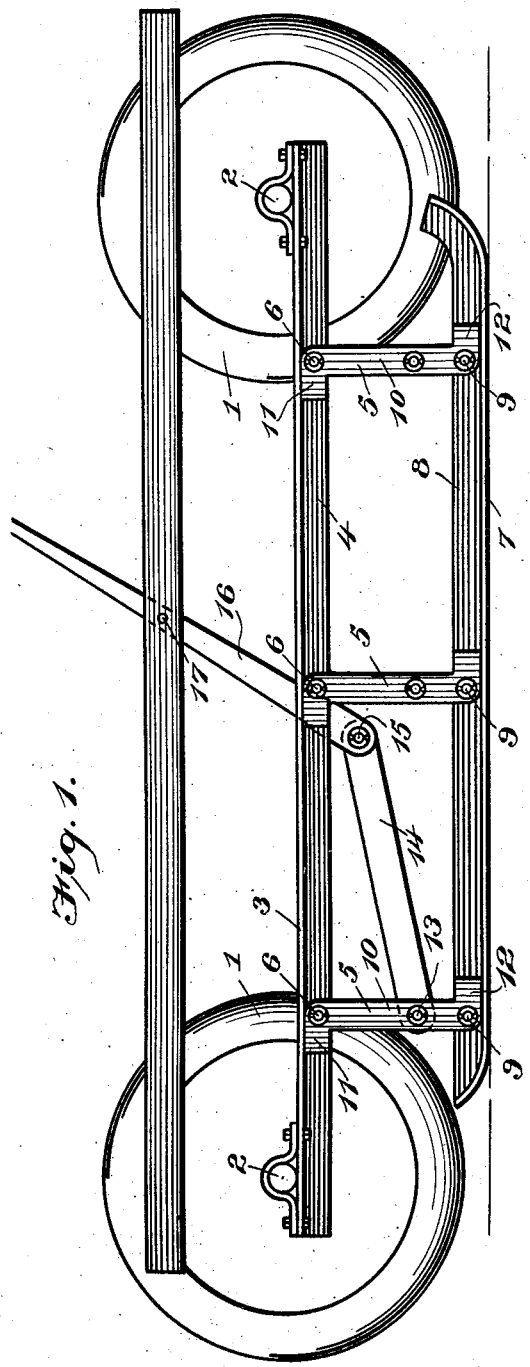
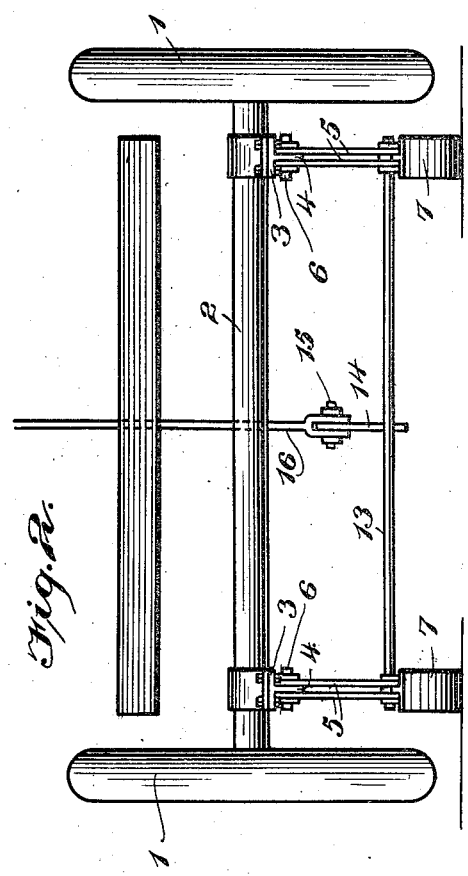
Witnesses
J. P. Britt
M. B. Gould
Inventor
Charles J. Roberts,
By C. E. Duffy
Attorney No. 862,414. PATENTED AUG. 6, 1907.
C. J. ROBERTS.
BRAKE FOR AUTOMOBILES.
APPLICATION FILED JULY 5, 1906.
2 SHEETS—SHEET 2.
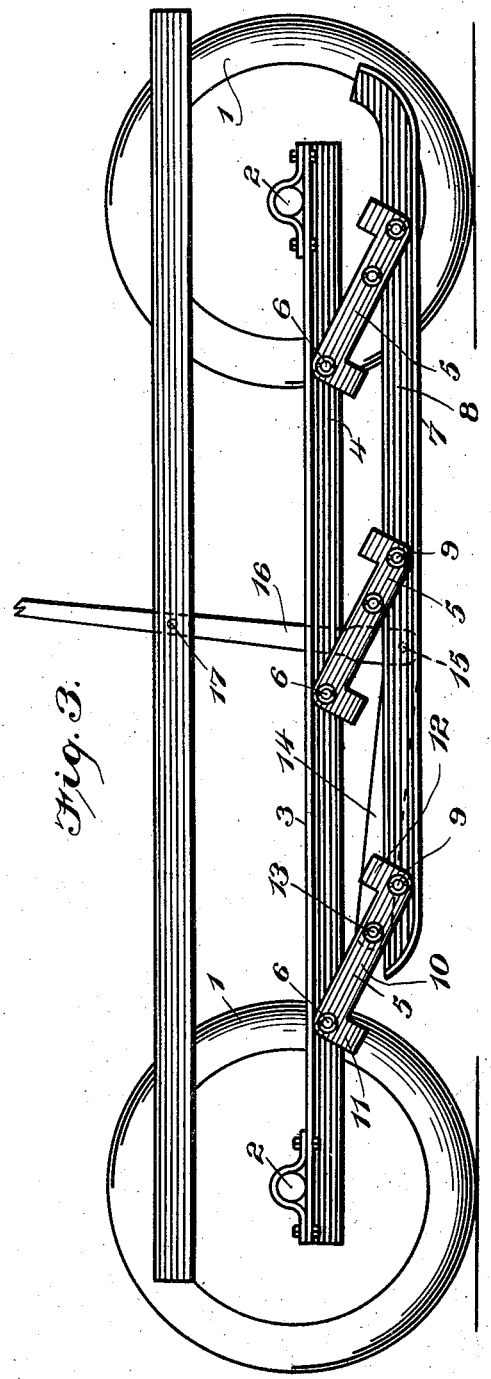
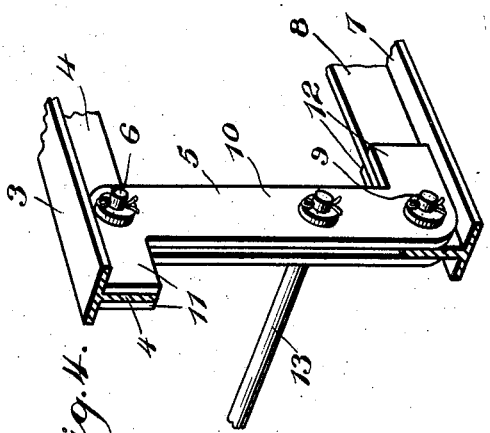
Witnesses
J. P. Britt
E. C. Duffy
Inventor
Charles J. Roberts
By O. E. Duffy & Son
Attorney

UNITED STATES PATENT OFFICE.

CHARLES J. ROBERTS, OF PAOLI, PENNSYLVANIA.

BRAKE FOR AUTOMOBILES.

No. 862,414.  Specification of Letters Patent.  Patented Aug. 6, 1907.

Application filed July 5, 1906. Serial No. 324,890.

*To all whom it may concern:*

Be it known that I, CHARLES J. ROBERTS, a citizen of the United States, residing at Paoli, in the county of Chester and State of Pennsylvania, have invented certain new and useful Improvements in Automobile Attachments; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to vehicles but more particularly to automobiles, and has for its object to provide an emergency brake, which when occasion requires can be instantly operated in such manner that the weight of the vehicle is thrown upon the brake shoes and at the same time raising the wheels of the vehicle out of contact with the ground.

A further object of my invention is to provide a locking device for vehicles and automobiles whereby it is impossible to move or start the vehicle or automobile as long as the device is in operative position.

A further object of my invention is to provide what is practically a jacking device for raising the wheels and body of a vehicle off the ground, as is necessary in order to make repairs or adjustments to wheels and tires.

A further object of my invention is to provide a device for relieving the wheels and tires of a vehicle or automobile from the continued strain to which the wheels and tires are usually put when the vehicle is at rest in a garage.

With all these objects in view my invention consists in the novel construction of the emergency brake and particularly in the construction of the shoe and in the construction of the connecting links and longitudinal beams carrying the s...

Referring to the accompanying drawings, Figure 1 is a side elevation of the wheels of a vehicle showing the attachment in operative position. Fig. 2 is a front elevation thereof. Fig. 3 is a side elevation showing the device or attachment in a raised position, and Fig. 4 is a fragmentary prospective view showing the connecting links and a portion of the brake shoe and longitudinal beam.

Like numerals of reference indicate the same parts throughout the several figures in which:—

1 indicates the wheels of the vehicle and 2 the axles. Preferably connected to the axles in any approved way are two longitudinal beams 3 preferably arranged in close proximity to the wheels 1 as shown in Fig. 2.

Referring now to Fig. 4 and also to Fig. 2 it will be seen that the longitudinal beams 3 are formed like a T, and it will also be seen that connected to the web 4 of the beam 3 on each side thereof are connecting links 5 which may be bolted or pivoted to the web 4 at 6.

7 indicates the brake shoe, which as shown in Fig. 1 is formed like a T to the web 8 to which are connected the links 5, said links being bolted or pivoted to the web 8 at 9.

Referring now particularly to the connecting links 5, as illustrated in Figs. 1, 3 and 4, it will be seen that they comprise a central portion 10 and a rectangular portion 11 on the upper end of the link 5, and a similar rectangular portion 12 at the lower end of the link 5, said rectangular portions 11 and 12 extending oppositely, as clearly shown in Fig. 4, said links 5 being arranged in pairs, one on each side of the webs 4 and 8 of the longitudinal beam 3 and the brake shoe 7.

Connecting each pair of connecting links 5 on each side of the machine is a rod 13, and preferably connected to the after rod 13 is a link 14 to which is pivoted at 15 an operating lever 16, said lever 16 being fulcrumed at 17 to any convenient portion of the frame, chassis or body of the vehicle or automobile, it merely being essential that the handle of the operating lever 16 being of convenient and easy reach to the driver or operator of the vehicle or automobile.

Having thus fully described the several parts of my invention its operation is as follows: When the lever 16 is in substantially a vertical position, as shown in Fig. 3, it draws the after rod 13, brake shoes and links 5 into a raised position, as shown in Fig. 3, in which position the attachment is raised entirely from the ground and in no way interferes with the movement of the vehicle. As shown, however, in the several figures the lower rectangular portion 12 of the links 5 extending forwardly, while the upper rectangular portion 11 of the links 5 extends rearwardly. In order, therefore, to bring the attachment into action the lever 16 is thrown into position shown in Fig. 1, which forces the links 5 and brake shoes 7 into position shown in Fig. 1. Considering therefore that the right hand end of the device, shown in Fig. 1, is the front of the vehicle it is evident that as the brake shoes 7 assume the position shown in Fig. 1 the machine is lifted from the ground and the entire strain is thrown on the links 5, and by reason of the rectangular extension 12 at the lower end of said links and a rectangular extension 11 on the upper end of said links, said extensions engaging the flanges of the longitudinal beam 3 and the brake shoes 7 further movement of the links 5 and brake shoe 7 is impossible, as said rectangular portions 11 and 12 of the links 5 act as stops just as soon as the said links 5 assume a vertical position as shown in Fig. 1. It is thus seen that in cases of emergency the entire vehicle is thrown upon its brake shoes 7 which will bring the vehicle to a sudden stop.

Besides the brake feature of this device it is evident that the brake shoes can be thrown in operative position at any time while the vehicle is at rest, as for the purpose of locking the vehicle against movement, and also acts in the place of jacks for raising the vehicle off the ground in order to repair the wheels or other parts of the vehicle; while the usual sudden strain on the tires of the vehicle is removed by throwing the shoes in operative position while the vehicle is at rest in a garage or the like. Thus by means of my device the tires of the vehicle are made to last longer, for the reason that a considerable portion of the strain on the tires is removed.

Having thus fully described my invention what I claim as new and desire to secure by Letters Patent of the United States, is:

1. In a device of the character described, the combination of a beam associated with the body of a vehicle, said beam having a horizontal flange and a vertical web, a brake shoe disposed under said beam, links connecting said beam and said brake shoe and an extension on the forward side of one of said links at the lower end of said link, and an extension on the after side of one of said links at the upper end of said link, said brake shoe comprising a horizontal flange and a vertical web, substantially as described.

2. In a device of the character described, the combination of a beam associated with the body of a vehicle, a brake shoe disposed under said beam, said beam and brake shoe each comprising a flange and a web, links connecting said beam and said shoe, and means on said links for engaging the said flange on said beam and said brake shoe, substantially as described.

In testimony whereof, I affix my signature, in presence of two witnesses.

CHARLES J. ROBERTS.

Witnesses:
C. M. FORREST,
C. HUGH DUFFY.